3,156,707
OXIDATION OF ALIPHATIC HYDROCARBONS
Ralph O. Kerr, Houston, Tex., assignor to Petro-Tex Chemical Corporation, Houston, Tex., a corporation of Delaware
No Drawing. Filed May 17, 1962, Ser. No. 195,419
5 Claims. (Cl. 260—346.8)

This invention relates to an improved process for the manufacture of dicarboxylic acid anhydrides by catalytic oxidation of aliphatic hydrocarbons and relates more particularly to an improved process for producing aliphatic dicarboxylic acid anhydrides such as maleic anhydride by reacting a mixture of an olefinic hydrocarbon and oxygen in the presence of a novel catalyst. This application is a continuation-in-part of my earlier filed application Serial Number 757,944, filed August 29, 1958, now abandoned.

It has been a continuing object in the art to provide a process for the oxidation of aliphatic hydrocarbons such as butene to maleic anhydride. Butene is readily available from many sources such as a by-product from refineries. Even though inexpensive olefins from petroleum have been available for decades the industry had not been able to develop to suitable catalyst for the production of maleic anhydride from olefins. Because of this reason, prior to this invention maleic anhydride was not being produced commercially from olefins.

In view of the advantages of utilizing olefins as the feed for the production of maleic anhydride, considerable effort was devoted to this problem throughout the years. According to U.S. 2,097,904, butene was oxidized to maleic anhydride with a maximum yield of about 42 weight percent over a catalyst containing tin vanadate, molybdenum oxide and titanium oxide supported on an inert carrier. As disclosed in U.S. 2,625,519, a catalyst comprising molybdenum oxide combined with cobalt oxide and boron produced weight percent yields of about 13 and 31 percent maleic anhydride from butene. According to U.S. 2,649,447, a catalyst containing oxides of molybdenum and phosphorus, preferably with an atomic ratio of 12 molybdenum to 1 of phosphorus, supported on a silica gel carrier produced yields of maleic anhydride between 20 to 33 weight percent from butene. In U.S. 2,719,853, a cracked naphtha contining about 60 percent olefins such as butene was oxidized in the presence of a vanadium arsenate catalyst to product only low yields of maleic anhydride, together with some citraconic anhydride. U.S. 2,773,838 describes the preparation of a catalyst for the oxidation of olefins. The disclosed supported catalyst is prepared by mixing ammonium metavanadate and phosphoric acid in the presence of the carrier. The actives are precipitated on the carrier. This catalyst produced a yield of 55.9 weight percent maleic anhydride from a butene mixture.

The yield of 55.9 weight percent reported in U.S. 2,773,838 for a supported catalyst is superior to the previous yields from butene reported by the prior art. However, even higher yields are desirable for a commercial process. Also additional improvements over the catalyst of U.S. 2,773,838 are desired. It is accordingly an object of this invention to provide a process for the production of aliphatic dicarboxylic anhydrides from aliphatic hydrocarbons at higher yields. Another object of this invention is to provide a catalyst for the production of maleic anhydride from olefins which catalyst does not cause high pressure drops through the reactor. Still another object of this invention is to provide a process for the production of maleic anhydride from olefins with a catalyst which has dimensional stability and which may be simply and uniformly prepared from run to run. It is another object of this invention to provide an improved process for the vapor phase oxidation of mono-olefins, particularly butene-1 or butene-2-, to maleic anhydride at yields of greater than 70 weight percent. Another object is to provide a catalyst with a suitable amount of catalytic surface for the production of maleic anhydride from olefins. An additional object of this invention is to prepare a catalyst which causes high conversions of olefins to produce high yields of maleic anhydride at a relatively low percent of catalyst actives on a carrier. These and other objects of this invention will be evident from the description which follows.

According to this invention these and other objects have been accomplished by providing a catalyst comprising the elements phosphorus and vanadium in critical ratios coated on a carrier by a particular method. The combination of phosphorus and vanadium must be coated on a carrier in order to provide a commercial catalyst. One reason for using a carrier is that the ordinary carriers cost only a fraction of the cost of the ingredients coated on the carrier. It has been found that when the actives are coated on a carrier the catalyst particles are not only more economical, but that these catalysts are superior to those containing no carrier, and that the mentioned objects of the invention are accomplished with the catalyst employing a carrier and produced according to this invention.

The catalyst comprising phosphorus, oxygen and vanadium are chemically combined in a complex onto the carrier. It is difficult to determine the exact chemical arrangement of the atoms in the catalyst complex. Oxides of vanadium and phosphorus are present when the catalyst is being used to oxidize the hydrocarbons to maleic anhydride. The atomic ratio of the phosphorus and vanadium should be about 1.0 to 2.0 atoms of phosphorous per atom of vanadium. Expressed in terms of the oxide, the ratio of $P_2O_5$ to $V_2O_5$ will be from about 1.0 to 2.0 mols of $P_2O_5$ per mol of $V_2O_5$. Preferably, the ratio of atoms of phosphorus to atoms of vanadium will be from about 1.1 to 1.6 atoms of phosphorus per atom of vanadium. The atomic raio of oxygen to the remaining components of the catalyst, when the catalyst is in the process of being used to catalyze the oxidation, is difficult to determine and is probably not constant due to the competing reactions of oxidation and reduction taking place during the reaction at the high temperatures. Perhaps at room temperature the ratio of oxygen to phosphorus may be about 2 to 5 atoms of oxygen per atom of phosphorus and the ratio of oxygen to vanadium may be from about 2 to 5 atoms of oxygen per atom of vanadium. The overall ratio of oxygen to the combined atoms of vanadium and phosphorus at room temperature then would be about 4 to 10 atoms of oxygen per combined atoms of vanadium and phosphorus.

The catalyst is formed by depositing a solution containing the prescribed ratios of phosphorus and vanadium on a carrier. When the solution is deposited on the carrier, the vanadium has an average valence of less than plus five. The vanadium with a valence of less than five may be obtained either by initially using a vanadium compound wherein the vanadium has a valence of less than five such as vanadyl chloride, or by initially using a vanadium compound with a valence of plus five such as $V_2O_5$ and thereafter reducing to the lower valence with, for example, hydrochloric acid during the catalyst preparation to form the vanadium oxysalt, vanadyl chloride, in situ. The vanadium compound may be dissolved in a reducing solvent, such as hydrochloric acid, which solvent functions not only to form a solvent for the reaction, but also to reduce the valence of the vanadium compound to a valence of less than 5. For example, a vanadium compound and phosphorus compound may be dissolved in any order in a suitable reducing solvent and the formation of the complex allowed to take place. Preferably, the vanadium compound is first dissolved in the solvent and thereafter the phosphorus compound is added. The reaction to form the complex may be accelerated by the application of heat. The deep blue color of the solution shows the vanadium has an average valence of less than 5. The complex formed is then, without a precipitation step, deposited as a solution onto the carrier and dried. The vanadium has an average valence of less than plus 5 at the time it is deposited onto the carrier. Generally, the average valence of the vanadium will be less than 4.6 such as between about plus 2.5 and 4.6 and usually between about plus 2.8 to 4.2 at the time of deposition onto the carrier.

A typical procedure for preparing the catalyst of this invention is as follows: vanadium pentoxide is dissolved slowly and carefully in concentrated hydrochloric acid and the mixture refluxed. The refluxed solution is a clear blue solution of vanadyl chlorides. The phosphorus atoms may then be introduced, for example, by the addition of concentrated phosphoric acid to the vanadyl chloride solution and the mixture again refluxed. The vanadium of this resulting complex has a valence of about 4. To this hot solution a carrier is added. The solution is then uniformly coated on the carrier particles and dried carefully.

A specific example of the preparation of a catalyst according to this invention is illustrated in Example 1 below. The catalyst was evaluated by oxidizing butene-2 to maleic anhydride. The weight percent yield of maleic anhydride was 83 percent. As a comparison to the results obtained with the catalyst of this invention a supported catalyst was prepared according to the method of U.S. 2,773,838. The details for the method of preparation are given in Example 2 below. The catalyst was prepared by mixing ammonium metavanadate and phosphoric acid in the presence of the carrier followed by precipitation of the actives on the carrier according to the patent. The same weight percent actives were used in both examples and the same type alumina carrier was used. Butene-2 was oxidized to maleic anhydride as in Example 1. The weight percent yield of maleic anhydride was 52 percent. Example 2 was repeated, as described in Example 3 below, with the exception that the carrier used was silicon carbide. The weight percent yield in this example was 53 percent. The advantage of a yield of 83 percent as compared to 52 or 53 percent is, of course, of evident commercial significance.

The solution which is deposited onto the carrier must contain the required ratios of atoms of phosphorus and vanadium. Further, the solvent must be a solvent which will allow the vanadium to remain at a valence of less than plus 5, such as at an average valence of no greater than about plus 4. The solvent used should not form compounds with the vanadium which compounds have a higher decomposition temperature than vanadium phosphate. Stated in another way, the anion of any compound formed between the solvent and the vanadium should be more volatile than the phosphate ion. For example, if aqueous hydrochloric acid is used as the solvent, the vanadium will form chlorides and after the catalyst has been formed and deposited on the carrier the chloride ions will be driven off by heat rather than the phosphorus ions.

Reducing agents for the vanadium may be either organic or inorganic. Suitable reducing agents would be those agents which will reduce vanadium of a valence of plus 5 to an average valence of no greater than about plus 4. Acids such as hydrochloric, hydroiodic, hydrobromic, acetic, oxalic, malic, citric, formic and mixtures thereof such as a mixture of hydrochloric and oxalic may be advantageously used. Sulphur dioxide may be used. Less desirably, sulfuric and hydrofluoric acids may be employed. Other reducing agents which may be employed, but which have not given as desirable catalysts are organic aldehydes such as formaldehyde and acetaldehyde; alcohols such as pentaerythritol, diacetone alcohol and diethanol amine. Additional reducing agents are such as hydroxyl amines, hydrazine, and nitric oxide. The reducing agent will be liquid or will be water soluble. Aqueous solutions of the reducing agents may be used. Nitric acid and similar oxidizing acids which would oxidize the vanadium from a valence of 4 to 5 during the preparation of the catalyst should be avoided. Preferably the amount of reducing agent will be at least the amount theoretically required to reduce the valence of the vanadium to the average valence of plus 4. Generally the reducing agents form oxysalts of vanadium. For example, if $V_2O_5$ is dissolved in hydrochloric or oxalic acid, the corresponding vanadium oxysalts are produced. These vanadium oxysalts should have as the salt forming anion an anion which is more volatile than the phosphate anion.

The catalyst complex containing phosphorus and vanadium may be formed by simply causing the combination of each of the ingredients in a solution or dispersion. Heat may be applied to accelerate the formation of the complex and one method of forming the complex is by causing the ingredients to react under reflux conditions at atmospheric pressure. Under reflux conditions this solution reaction generally takes about one to two hours.

Before the carrier is combined with the catalyst the solution of catalyst is preferably concentrated to a solution which contains from about 30 to 80 percent volatiles and better results have been obtained when there is from about 50 to 70 percent volatiles by weight at the time the carrier is combined. The carrier may be added to the catalyst solution or the catalyst solution may be poured onto the carrier. Less desirably, the alundum or other carrier may be present during the whole course of reactions to provide the desired phosphorus-vanadium complex. After the catalyst complex has been coated onto the carrier and dried, the vanadium may be converted to a more active form by heating in the presence of an oxidizing gas, such as in air at a temperature of greater than 200° C.

Any phosphorus and vanadium compounds may be used as starting materials which may be dissolved in a solvent under conditions wherein the vanadium ions have the reduced valence of less than plus 5 as explained above and which when uniformly deposited on the carrier may be dried, for example at 350° C. in air, to form the catalyst containing the specified ratios of ingredients. Preferred are phosphorus and vanadium compounds which when introduced into a boiling aqueous hydrochloric acid at 760 mm. of mercury, containing 37 percent by weight hydrochloric acid, form a solution. That is, in the solution the phosphorus and vanadium atoms or ions are free to combine with each other.

As the source of phosphorus, various phosphorus compounds may be used, such as metaphosphoric acid, triphosphoric acid, pyrophosporic acid, ortho-phosphoric acid, phosphorus pentoxide, phosphorus oxyiodide, ethyl phosphate, methyl phosphate, amine phosphate, phosphorus pentachloride, phosphorous trichloride, phosphorus oxybromide and the like.

Suitable vanadium compounds useful as starting materials are compounds such as vanadium pentoxide, ammonium metavanadate, vanadium trioxide, vanadyl chloride, vanadyl dichloride, vanadyl trichloride, vanadium sulfate, vanadium phosphate, vanadium tribromide, vanadyl formate, vanadyl oxalate, metavanadic acid, pyrovanadic acid, and the like.

The carrier or support normally has a low surface area, as usually measured, from about .001 to about 5 square meters per gram. A desirable form of carrier is one which has a dense non-absorbing center and a rough enough surface to aid in retaining the catalyst adhered thereto during handling and under reaction conditions. The carrier may vary in size but generally is from about 2½ mesh to about 10 mesh in the Tyler Standard screen size. Carrier particles as large as ¼ inch times ¼ inch cylinders or larger are satisfactory. Carriers much smaller than 10 to 12 mesh normally cause an undesirable pressure drop in the reactor, unless the catalysts are being used in a fluid bed apparatus. Very useful carriers are alundum, silicon carbide, carborundum, pumice, kieselguhr, asbestos and the like. Any of the alundums or other inert alumina carriers may be used. Likewise, a variety of silicon carbides may be employed. Silica gel may be used. The amount of the catalyst complex on the carrier is usually in the range of about 10 to about 30 weight percent of the total weight of complex plus carrier and preferably from about 14 to about 24 weight percent on an inert carrier such as alundum. The amount of the catalyst complex deposited on the carrier should be enough to substantially coat the surface of the carrier and this normally is obtained with the ranges set forth above. With more absorbent carriers, larger amounts of material may be required to obtain essentially complete coverage of the carrier. In the case of silicon carbide, about 25 percent of catalyst is normally used. In a fixed bed process the final particle size the catalyst articles which are coated on a carrier will also preferably be about 2½ to about 10 mesh size in the Tyler Standard screen size. The carriers may be of a variety of shapes, the preferred shape of the carriers is in the shape of cylinders or spheres. Although more economical use of the catalyst on a carrier in fixed beds is obtained, as has been mentioned, the catalyst may be employed in fluid bed systems. Of course, the particle size of the catalyst used in fluidized beds is quite small, usually varying from about 10 to about 150 microns.

Inert diluents such as silica may be present in the catalyst, but the combined weight of the essential ingredients of phosphorus, oxygen and vanadium should preferably consist essentially of at least about 50 weight percent of the composition which is coated on the carrier, and preferably these components are at least about 75 weight percent of the composition coated on the carrier, and more preferably at least about 95 weight percent. If desired, any remainder other than the atoms of phosphorus, oxygen and vanadium may be any essentially inert non-catalytic ingredient intimately combined with the phosphorus, oxygen and vanadium as a part of the coating on the carrier; or other modifying or stabilizing agents may be used.

The oxidation of the olefin to aliphatic dicarboxylic anhydride may be accomplished by contacting the olefin in low concentrations in oxygen with the described catalyst. Air is entirely satisfactory as a source of oxygen, but synthetic mixtures of oxygen and diluent gases, such as nitrogen, also may be employed. Air enriched with oxygen may be employed.

The gaseous feed stream to the oxidation reactors normally will contain air and about 0.5 to about 2.5 mol percent hydrocarbons such as butene. About 1.0 to about 1.5 mol percent of the monoolefin are satisfactory for optimum yield of product for the process of this invention. Although higher concentrations may be employed, explosive hazards may be encountered. Concentrations of butene-2 of less than about one percent, of course, will reduce the total yields obtained at equivalent flow rates and thus are not normally economically employed. The flow rate of the gaseous stream through the reactor may be varied within rather wide limits, but a preferred range of operations is at the rate of about 50 to 300 grams of olefin per liter of reactor space containing catalyst per hour and more preferably about 100 to about 250 grams of olefin per liter of reactor space containing catalyst per hour. Residence times of the gas stream will normally be less than about 4 seconds, more preferably less than about one second, and down to a rate where less efficient operations are obtained. The flow rates and residence times are calculated at standard conditions of 760 mm. of mercury and at 25° C.

A variety of reactors will be found to be useful and multiple tube heat exchanger type reactors are quite satisfactory. Typically, the tubes of such reactors may vary in diameter from about ¼ inch to about 3 inches, and the length may be varied from about 3 to about 10 or more feet. The oxidation reaction is an exothermic reaction and, therefore, relatively close control of the reaction temperature should be maintained. It is desirable to have the surface of the reactors at a relatively constant temperature and some medium to conduct heat from the reactors is necessary to aid temperature control. Such media may be Woods metal, molten sulfur, mercury, molten lead, and the like, but it has been found that eutectic salt baths are completely satisfactory. One such salt bath is a sodium nitrate-sodium nitrite-postassium nitrate eutectic constant temperature mixture. An additional method of temperature control is to use a metal block reactor whereby the metal surrounding the tube acts as a temperature regulating body. As will be recognized by the man skilled in the art, the heat exchange medium may be kept at the proper temperature by heat exchangers and the like. The reactor or reaction tubes may be iron, stainless steel, carbon-steel, nickel, glass tubes such as Vycor and the like. Both carbon-steel and nickel tubes have excellent long life under the conditions of the reactions described herein. Normally, the reactors contain a preheat zone of an inert material such as ¼ inch alundum pellets, inert ceramic balls, nickel balls or chips and the like, present at about one-half to one-fourth the volume of the active catalyst present.

The temperature of reaction may be varied within some limits, but normally the reaction should be conducted at temperatures within a rather critical range. The oxidation reaction is exothermic and once reaction is underway, the main purpose of the salt bath or other media is to conduct heat away from the walls of the reactor and control the reaction. Better operations are normally obtained when the reaction temperature employed is no greater than about 100° C. above the salt bath temperature. The temperature in the reactor, of course, will also depend to some extent upon the size of the reactor and the olefin concentration. Under usual operating conditions, in compliance with the preferred procedure of this invention, the temperature in the center of the reactor, measured by thermocouple, is about 375° C. to about 550° C. The range of temperature preferably employed in the reactor, measured as above, should be from about 400° C. to about 515° C. and the best results are ordinarily obtained at temperatures from about 420° C. to about 500° C. Described another way, in terms of salt bath reactors with carbon steel reactor tubes about 1.0 inch in diameter, the salt bath temperature will usually be controlled between about 350° C. to about 550° C. Under normal conditions, the temperature in the reactor ordinarily should not be allowed to go above about 550° C. for extended lengths of time because of decreased yields and possible deactivation of the novel catalyst of this invention.

The pressure on the reactor is not generally critical, and the reaction may be conducted at atmospheric, superatmospheric or below atmospheric pressure. The exit pressure will be at least slightly higher than the ambient pressure to insure a positive flow from the reaction. The pressure of the inert gases must be sufficiently high to overcome the pressure drop through the reactor.

The dicarboxylic acid anhydrides may be recovered by a number of ways well known to those skilled in the art. For example, the recovery may be by direct condensation or by adsorption in suitable media, with subsequent separation and purification of the dicarboxylic acid anhydride.

The catalyst of the present invention and the process of using them are useful for the production of aliphatic dicarboxylic acid anhydrides from aliphatic hydrocarbons generally. Ethylenically unsaturated hydrocarbons of of from 4 to 6 carbon atoms such as 3-methylbutene-1, isoprene, butadiene-1,3 and 2,3-dimethyl butadiene are useful starting materials. The preferred starting materials are the four carbon hydrocarbons such as butene-1, cis or trans butene-2 and mixtures thereof. It is an advantage of this invention that high yields of maleic anhydride may be obtained from butene-1 or butene-2. Useful feeds as starting materials may be mixed hydrocarbon streams such as refinery streams. For example, the feed material may be the olefin-containing hydrocarbon mixture obtained as the product from the dehydrogenation of hydrocarbons. Another source of feed for the present process is from refinery by-products. For example, in the production of gasoline from higher hydrocarbons by either thermal or catalytic cracking a predominantly $C_4$ hydrocarbon stream may be produced and may comprise a mixture of butenes together with butadiene, butane, isobutane, isobutylene and other ingredients in minor amounts. These and other refinery by-products which contain normal ethylenically unsaturated hydrocarbons are useful as starting materials. Although various mixtures of hydrocarbons are useful, the preferred hydrocarbon feed contains at least 70 weight percent butene-1, butene-2 and/or butadiene-1,3 and mixtures thereof, and more preferably contains at least 95 percent butene-1, butene-2 and/or butadiene-1,3 and mixtures thereof. Any remainder usually will be aliphatic hydrocarbons.

The aliphatic dicarboxylic acid anhydrides, such as maleic anhydride, have many well known commercial uses such as a modifier for phthalic anhydride-glycerol alkyd resins.

Example 1

A catalyst was prepared according to the process of the present invention. The catalyst contained an atomic ratio of phosphorus to vanadium of 1.6 atoms of phosphorus per atom of vanadium. The catalyst contained 20 percent by weight actives on 6 to 8 mesh cylindrical alundum tabular inert alumina carrier. The catalyst was prepared by dissolving 44.5 grams of vanadium pentoxide in 1000 ml. of concentrated aqueous hydrochloric acid solution containing 37 percent by weight hydrochloric acid. The mixture was refluxed slowly and after the initial reaction the mixture was refluxed for about 12 hours. To the solution was then added 91.2 grams of aqueous phosphoric acid solution containing 85 weight percent $H_3PO_4$. This mixture was then again refluxed to form the catalyst complex. The solution was then evaporated to about 200 milliliters. The concentrated solution was then deposited on 400 grams of ⅛-inch x ⅛-inch cylindrical inert alundum alumina pellets and thereafter dried by heating to a temperature of about 120° C. The catalyst was evaluated in a 36 inch long ¾ inch internal diameter nickel tube surrounded by an electrically heated, regulated brass block. 200 ml. of the catalyst particles were loaded into the bottom of the reactor and on top of the catalyst was placed about 50 ml. of 6 mm. x 6 mm. Vycor[1] Raschig rings to form a preheat zone. The throughput was 99 grams of butene-2 per liter of catalyst per hour. The mol percent butene-2 in the airstream was 0.9 percent. The maximum yield of maleic anhydride was obtained at a block temperature of 495° C. At this temperature the weight percent yield of maleic anhydride was 83.1 percent based on the weight of butene fed. The actives were uniformly coated on the carrier and did not dust. The pressure drop across the reactor was low.

Example 2

A catalyst was prepared according to the method of U.S. 2,773,838. The catalyst was prepared from $NH_4VO_3$ and $H_3PO_4$. As in Example 1 the catalyst contained an atomic ratio of phosphorus to vanadium of 1.6 atoms of phosphorus per atom of vanadium. The catalyst also contained 20 percent by weight actives on identical 6 to 8 mesh alundum to that used in Example 1. A solution of 1444 grams of an aqueous solution of $H_3PO_4$ containing 85 weight percent $H_3PO_4$ was dissolved in 2800 cc. of distilled water and the solution was allowed to cool to room temperature. 915.2 grams of $NH_4VO_3$ was then added to the solution and dissolved. 6410 grams of the same type of alumina carrier as used in Example 1 was added to the mixture. The beaker containing the actives and inert supports was placed in a cylindrical heating mantle. The mixture of actives and inerts was heated and stirred manually until the excess liquid had evaporated and the pellets were no longer sticking. The dried catalyst particles contained 20 percent by weight active catalyst calculated as $V_2O_5$ and $P_2O_5$ based on the total weight of the active catalyst coating plus the carrier. The ratio of phosphorus to vanadium was equivalent to a 4 to 5 weight ratio of $V_2O_5$ to $P_2O_5$, which is also equivalent to an atomic ratio of 1.6 atoms of phosphorus per atom of vanadium.

The prepared catalyst was evaluated in the same brass block reactor as used in Example 1. The catalyst was evaluated by feeding the butene-2-air mixture containing 1.0 mol percent butene through the catalyst at a throughput ratio of 100 grams of butene-2 per liter of catalyst per hour. The maximum yield of maleic anhydride was obtained at a block temperature of 504° C. The yield of maleic anhydride at this temperature was 52.0 weight percent.

Example 3

The procedure of Example 2 was duplicated except that 4 to 8 mesh silicon carbide inert pellets (Carborundum Corporation, Type CMC) were substituted as the carrier. The concentration of butene-2, contact time, and the throughput rate were the same as in Example 2. The maximum yield of maleic anhydride was obtained at a block temperature of 550° C. At this temperature the weight percent yield of maleic anhydride was 53 percent.

Example 4

The catalyst was prepared according to the procedure of Example 1 containing an atomic ratio of phosphorus to vanadium of 1.5 atoms of phosphorus per atom of vanadium. The actives were coated in an amount of 20 weight percent on silicon carbide (Carborundum Corporation, Type CMC, 4 to 8 mesh). The catalyst was evaluated in the same block reactor used in Example 1. The flow rate was 100 grams of butene-2 per liter of catalyst per hour. The contact time was 1.8 seconds. The concentration of the butene in air was 2.0 mol percent. The maximum yield was obtained at a block temperature of 490° C. At this temperature the yield of maleic anhydride was 79 weight percent based on the amount of butene-2 fed to the reactor.

Example 5

To check the reproducibility and the evaluation technique, the above Example 4 was repeated with a newly prepared catalyst. In this run the maximum yield of maleic anhydride was maintained at a block temperature of 520° C. At this temperature the yield of maleic anhydride was 76 weight percent as compared was the 79 percent of Example 4.

Example 6

The catalyst was prepared according to the procedure of Example 1. This catalyst had an atomic ratio of phosphorus to vanadium of 1.5 atoms of phosphorus per atom of vanadium. The catalyst solution was deposited on ⅛" x ⅛" inert cylindrical alundum pellets in an amount of 20 weight percent based on the total weight of actives plus carrier. 300 ml. of this catalyst was evaluated in the same block reactor used in Example 1. At a throughput of 132 grams of butene per liter of catalyst per hour the maximum yield of maleic anhydride was obtained at a salt bath temperature of 510° C. At this ---
[1] Vycor is the trade name of Corning Glass Works, Corning, N.Y., and is composed of approximately 96 percent silica with the remainder being essentially $B_2O_3$.

temperature the yield of maleic anhydride was 78 weight percent.

Example 7

A catalyst for oxidation of butene-2 to maleic anhydride was prepared as follows. 51.7 grams of vanadium pentoxide $V_2O_5$ was added to 800 milliliters of concentrated hydrochloric acid. The mixture was refluxed slowly and after the initial reaction the mixture was refluxed for 10 to 16 hours. After a blue solution was obtained, showing that a homogeneous complex of vanadyl chloride, vanadyl oxychloride, was formed, 78.5 grams of 85.9 weight percent phosphoric acid was added to the mixture and the mixture again refluxed. The resulting deep blue solution was evaporated to about 200 milliliters. To the hot solution was added 400 grams of extracted alundum. The extracted alundum, 4 to 8 mesh, which contained 87.8 percent aluminum oxide, 11.2 percent silicon oxide, 0.2 percent ferric oxide, 0.3 titanium oxide and 0.1 percent each of calcium oxide, sodium oxide and potassium oxide by chemical analysis, had a bulk density of 1.9 grams per cubic centimeter and less than one square meter per gram surface as measured by nitrogen absorptions; was extracted with concentrated hydrochloric acid, washed with distilled water and dried in an oven at 150° C. Deposition of the phosphorus-vanadium complex on the alundum was carried out by combined heating, mixing and stirring at a temperature to obtain slow and gradual drying of the material. After about an hour, a free flowing catalytic material was obtained which had the catalyst complex uniformly deposited on the surface of the alundum. The coated alundum contained 20 weight percent of the complex of a molar ratio equivalent to 1.0 $V_2O_5$ to 1.2 $P_2O_5$.

Example 8

300 milliliters of the catalyst of Example 7 was packed in a 3 foot carbon steel tube, ¾ inch inside diameter, with inert ¼ inch alundum pellets on top of the catalyst material to a height ⅓ of the height of the catalyst. The reactors were encased in a 7 percent sodium nitrate-40 percent sodium nitrite-53 percent potassium nitrate eutectic mixture constant temperature salt bath. The reactor was slowly warmed to 500° C. while passing a gas stream containing 0.7 mole percent butene-2 in air through the catalyst bed. The reactor bottom pressure was maintained at 1 p.s.i.g. After the reactor had reached 500° C., the catalyst was aged by passing the butene-2 air mixture therethrough for 24 hours. The salt bath temperature was then lowered to 460° C. The butene-2 concentration in the reactor feed stream was increased to 1.25 mol percent and collection of maleic anhydride product begun. The salt bath temperature was adjusted to optimum yield of maleic anhydride, 480° C. in this case, and held at that temperature. The residence time of the gas stream passing through the reactor was less than about one second, calculated at 0.16 second reaction conditions. The exit gases from the reactor were cooled to about 50° C. at about ½ p.s.i.g. Under this condition, about 58 percent of the maleic anhydride dropped out of the gas stream. About 75 percent of the maleic anhydride in the reactor effluent may be recovered by condensation. A water scrubber recovery and subsequent fractionation were used to recover and purify the remaining maleic anhydride in the gas stream after condensation. The combined maleic anhydride recovered may be purified and recovered at a temperature of about 140–145° C., overhead and 145° C. bottoms temperatures in a fractionator. The purified product had a purity of 99.9 percent maleic anhydride.

(1) At a flow rate of 60 grams of butene-2 per liter of catalyst per hour and a salt bath temperature of 475° C., a yield of 91 weight percent maleic anhydride was obtained.

(2) At a flow rate of 150 grams of butene-2 per liter of catalyst per hour, a salt bath temperature of 490° C., pressure at reactor inlet of 17 p.s.i.g. and pressure at reactor outlet of 1 p.s.i.g., a yield of 82 weight percent maleic anhydride was obtained. This flow rate is equivalent to space velocity of 60 liters of butene-2 STP per liter catalyst hour and about 5500 liters of butene-2 and air per liter catalyst hour.

(3) At a flow rate of 100 grams butene-2 per liter of catalyst per hour, a salt bath temperature of 480° C., pressure at reactor inlet of 9 p.s.i.g., pressure at reactor outlet of 1 p.s.i.g., a weight percent yield of maleic anhydride of 87 was obtained. This flow rate is equivalent to a space velocity of 35 to 40 liters of butene-2 STP per liter catalyst hour.

(4) At a flow rate of 226 grams of butene-2 per liter of catalyst per hour and a salt bath temperature of 485° C., a yield of 72 weight percent maleic anhydride was obtained.

Example 9

Following the procedure of Example 8 (1), a number of catalysts were tested containing varying ratios of phosphorus to vanadium calculated as the equivalent ratio of $V_2O_5$ to $P_2O_5$:

(1) At a flow rate of 134 grams of butene-2 per liter of catalyst per hour, a yield of 81 percent maleic anhydride was obtained with a catalyst containing a molar ratio equivalent to a ratio of 1 to 1.4 of $V_2O_5$ to $P_2O_5$. At a flow rate of 198 grams of butene-2 per liter of catalyst per hour, a yield of 77 percent maleic anhydride was obtained with the same catalyst.

(2) At a flow rate of 135 grams of butene-2 per liter of catalyst per hour, a yield of 78 percent maleic anhydride was obtained with a catalyst containing a molar ratio equivalent to a ratio of 1 to 1.6 of $V_2O_5$ to $P_2O_5$. At a flow rate of 206 grams of butene-2 per liter of catalyst per hour, a yield of 74 percent maleic anhydride was obtained with the same catalyst.

Example 10

Following the procedure and employing the catalyst of Example 8 (1), the butene-2 concentration of the gas stream through the reactors was varied with the following results:

(1) At a butene-2 concentration in air of 1.8 percent, a yield of 72 percent maleic anhydride was obtained.

(2) At a butene-2 concentration of 1.24 mol percent, a yield of 87 percent maleic anhydride was obtained.

(3) At a concentration of one percent butene-2, a yield of 87 percent maleic anhydride is obtained.

I claim:

1. A process for the preparation of maleic anhydride at high yields which comprises contacting a gaseous mixture of butene and oxygen at an elevated temperature with a catalyst obtained by depositing on a carrier a catalyst solution of phosphorus and vanadium atoms, in an atomic ratio of about 1.0 to 2.0 atoms of phosphorus per atom of vanadium, the said vanadium having a valence of no greater than about four at the time of deposition of the solution on the carrier, and thereafter drying the resulting coated carrier to form the catalyst, the said catalyst solution having been prepared by dissolving vanadium pentoxide in an aqueous solution of hydrochloric acid and thereafter adding the phosphorus atoms to the solution.

2. A process for the preparation of maleic anhydride at high yields which comprises contacting a gaseous mixture of butene and oxygen at an elevated temperature with the catalyst obtained by depositing on a carrier a catalyst solution of phosphorus and vanadium atoms, in an atomic ratio of about 1.0 to 2.0 atoms of phosphorus per atom of vanadium, the said catalyst having been formed by reacting in solution vanadium atoms of an average valence of less than 4.6 with phosphorus atoms to form a catalyst complex in solution, depositing the solution of the catalyst complex onto carrier particles with the vanadium still having a valence of less than 4.6 at the time of deposition of the solution on the carrier, and thereafter drying the resulting coated carrier to form the catalyst.

3. A process for the preparation of maleic anhydride at high yields which comprises contacting a gaseous mixture of butene and oxygen at an elevated temperature with the catalyst obtained by depositing on a carrier a catalyst solution of phosphorus and vanadium atoms, in an atomic ratio of about 1.0 to 2.0 atoms of phosphorus per atom of vanadium, the said catalyst having been formed by reacting vanadium atoms of an average valence of less than 4.6 in a solvent selected from the group consisting of hydrochloric acid, hydroiodic acid, hydrobromic acid, acetic acid, oxalic acid, malic acid, citric acid, formic acid, sulphur dioxide, sulfuric acid, hydrofluoric acid, formaldehyde, acetaldehyde, pentaerythritol, diacetone alcohol, diethanol amine, hydroxyl amines, hydrazine nitric oxide and mixtures thereof with phosphorus atoms to form a catalyst complex in the said solution, depositing the solution of the catalyst complex onto carrier particles with the vanadium still having a valence of less than 4.6 at the time of deposition of the solution on the carrier, and thereafter drying the resulting coated carrier to form the catalyst.

4. A process for the preparation of maleic anhydride at high yields which comprises contacting a gaseous mixture of butene and oxygen at an elevated temperature with the catalyst obtained by depositing on a carrier a catalyst solution of phosphorus and vanadium atoms, in an atomic ratio of about 1.0 to 2.0 atoms of phosphorus per atom of vanadium, the said catalyst having been formed by reacting in hydrochloric acid solution vanadium atoms of an average valence of less than 4.6 with phosphorus atoms to form a catalyst complex in hydrochloric acid solution, depositing the solution of the catalyst complex onto carrier particles with the vanadium still having a valence of less than 4.6 at the time of deposition of the hydrochloric acid solution on the carrier, and thereafter drying the resulting coated carrier to form the catalyst.

5. A process for the preparation of maleic anhydride at high yields which comprises contacting a gaseous mixture of butene and oxygen at an elevated temperature with a catalyst obtained by depositing on a carrier a catalyst solution of phosphorus and vanadium atoms, in an atomic ratio of about 1.0 to 2.0 atoms of phosphorus per atom of vanadium, the said catalyst having been formed by dissolving vanadium atoms of a valence of five in an aqueous solution of reducing acid which will form an oxysalt with vanadium to reduce the vanadium atoms to an average valence of no greater than four and to form a vanadium oxysalt, adding phosphorus atoms to react with the vanadium oxysalt having reduced vanadium atoms of a valence of no greater than four to form a catalyst complex, combining the said complex with a carrier and thereafter drying the complex on the carrier.

References Cited in the file of this patent

UNITED STATES PATENTS

| 2,180,353 | Foster | Nov. 21, 1939 |
| 2,294,130 | Porter | Aug. 25, 1942 |
| 2,773,838 | Reid et al. | Dec. 11, 1956 |
| 2,773,921 | Rylander et al. | Dec. 11, 1956 |
| 2,833,728 | Bielowski | May 6, 1958 |
| 2,837,489 | Osberg | June 3, 1958 |
| 2,995,580 | Miller | Aug. 8, 1961 |
| 3,030,387 | Benoit | Apr. 17, 1962 |

UNITED STATES PATENT OFFICE
CERTIFICATE OF CORRECTION

Patent No. 3,156,707            November 10, 1964

Ralph O. Kerr

It is hereby certified that error appears in the above numbered patent requiring correction and that the said Letters Patent should read as corrected below.

Column 1, line 43, for "contining" read -- containing --; column 5, line 21, after "size" insert -- of --; column 6, line 14, for "nitrite-postassium" read -- nitrite-potassium --; column 7, line 4, for "butent-1" read -- butene-1 --; column 8, line 61, for "was", second occurrence, read -- with --; column 11, line 18, after "hydrazine" insert a comma.

Signed and sealed this 20th day of April 1965.

(SEAL)
Attest:

ERNEST W. SWIDER            EDWARD J. BRENNER
Attesting Officer            Commissioner of Patents